United States Patent Office 2,699,379
Patented Jan. 11, 1955

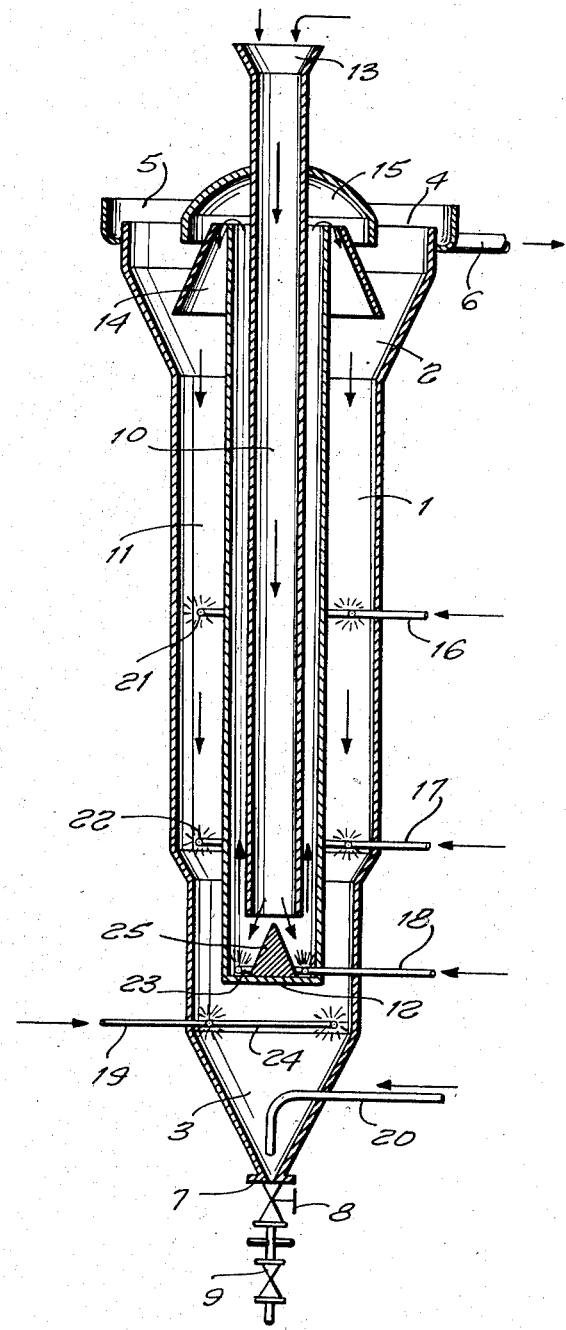

2,699,379

EXTRACTION APPARATUS

José Aramburu Luque, Barcelona, Spain

Application April 15, 1950, Serial No. 156,099

Claims priority, application Spain April 22, 1949

3 Claims. (Cl. 23—271)

The present invention relates generally to an improved method and apparatus for the separation of materials having differential solubility in a solvent or extraction medium. More particularly the invention is concerned with a method and apparatus for the separation of potassium chloride present in crude minerals obtained from mines, such as sylvinite, carnallite and similar soluble salts, generally; such method and apparatus being characterized by great simplicity and ease of operation together with substantially reduced costs and substantially increased efficiency.

With particular reference to the extraction of relatively pure potassium chloride from crude minerals obtained from mines, it is noted that such minerals generally contain only sodium chloride, potassium chloride and negligible quantities of marl.

In conventional methods for the separation of the sodium chloride and potassium chloride from crude minerals, use is made of the physical property of the hot mother liquor or solvent medium i. e. the property of differential solubility of potassium chloride and sodium chloride therein. After the crude mineral has been treated with the solvent medium the suspension need only be cooled in order to precipitate the potassium salt, whereupon the solvent medium is generally regenerated and returned for a repetition of the separation cycle. Such conventional methods and apparatus are generally complicated, costly and involve cumbersome and heavy equipment which not alone make for a low rate of production but also require considerable power for normal operation.

Equipment of the type described generally comprises essentially a large cast-iron vessel disposed horizontally and having a longitudinal shaft provided with paddles which serve both to stir the material suspended in the mother liquor or solvent medium and to advance it toward the outlet where it is removed by an elevator or similar device. The circulation of the mother liquor or solvent medium is generally counter-current to the flow of the material in the interests of thorough homogeneous mixing and enhanced efficiency. Usually the upper part of the vessel is provided with heating means to raise the temperature of the suspended mineral. The cost of such equipment is extremely high and moreover its excessive bulk, low productivity and high power consumption give rise to the need for a method employing simpler, more compact and more economical apparatus without the sacrifice of efficiency.

Accordingly, it is a primary object of the present invention to provide a method and apparatus of the character indicated which will obviate the aforementioned disadvantages.

Another object of the invention is the provision of an improved method and apparatus for the separation of materials having differential solubility in a solvent medium wherein the apparatus is characterized by simplicity of construction, compactness and ease of fabrication and wherein the separation operation may be carried out in a substantially continuous manner, with high productivity and low power consumption.

With the above objects in view, a preferred embodiment of my present apparatus comprises essentially a vertically elongated outer vessel for the reception of the crude mineral suspended in a predetermined amount of the hot mother liquor or solvent medium, the vessel having at the upper end thereof a preferably annular collecting trough for a purpose to be fully described hereinafter. A pair of concentric conduits is disposed axially within the outer vessel and defines a path of flow for the suspended material being separated, the innermost of said conduits being open at both ends thereof and the outermost of said conduits communicating at its upper end with said outer vessel and being closed at its lower end adjacent the lower open end of the innermost conduit.

Adjacent the closed lower end of the outermost conduit, means is provided for introducing hot mother liquor or solvent under pressure, thereby forcing the charge in the inner conduit to rise through the outer conduit and into the outer vessel toward the collecting trough situated at the upper end thereof. The concentric pair of conduits housed within the outer vessel are preferably provided with heating elements in order to raise the temperature of the mineral and replace the heat lost by the solvent in the process of solution. The residue of the material is deposited in the chamber defined between the inner walls of the outer vessel and the outermost inner conduits, to be finally discharged through a valve at the bottom of the outer vessel. It has also been found desirable to provide means spaced along the height of the outer vessel for the injection of hot and cold water as well as to provide a cold water ejector adjacent the outlet of the outer vessel in order to carry away the residue, consisting mostly of sodium chloride, to auxiliary draining or filtering equipment.

The foregoing objects as well as additional objects and advantages of the invention will be readily understood in the course of the following detailed description taken in connection with the accompanying drawing which illustrates a preferred embodiment of the invention and wherein the single figure illustrates schematically an extraction apparatus embodying the features of the invention.

The extraction apparatus comprises a preferably cylindrical outer vessel 1 having an outwardly flaring or frusto-conical top portion 2 and a lower conical portion 3. The upper end of vessel 1 is provided with a preferably annular collecting trough 5 having an outlet pipe 6. At its opposite end vessel 1 terminates in a discharge port 7 controlled by a discharge valve 8 disposed between said port and an ejector 9.

Disposed axially and concentrically within outer vessel 1, is a pair of concentric conduits 10 and 11 defining a path of flow for the suspended material, the innermost of said conduits being open at both ends thereof and the outermost of said conduits communicating at its upper end with said outer vessel and being closed at its lower end, as indicated by reference numeral 12 in the drawing. Inner conduit 10 is preferably provided with an upwardly flaring charge hopper 13 in order to facilitate the introduction of the crude mineral suspended in the mother liquor or solvent medium.

At the end of outer conduit 11 opposite its closed end 12, a baffle member 14, which may be in the form of a frusto-conical skirt, is provided and above said baffle member and preferably attached to the periphery of the innermost conduit 10, a cover member 15 is disposed.

Means are provided for introducing hot mother liquor or solvent within the outer vessel 1 at various levels and said means may take the form of pipes 16, 17, 18 and 19, placed, for example, approximately half-way up said vessel, one third of the way up said vessel, at the level of closed end 12 of conduit 11, at the junction of vessel 1 with conical portion 3, and at the mid-point of the latter, respectively. Said pipes 16, 17, 18 and 19 are connected to circular pipe rings 21, 22, 23 and 24, provided with a predetermined number of openings. Pipe 20 is bent downwardly within conical chamber 3 with its outlet directed toward the discharge port 7 of said chamber. A baffle member 25, preferably of conical shape, is provided at the closed lower end 12 of outer conduit 11 facing the lower opening of conduit 10.

The operation of the apparatus may be described as follows:

The entire charge of crude mineral together with hot mother liquor or solvent at a temperature of approximately 100° C. is introduced through the charge hopper 13 of innermost conduit 10. The suspended mixture passes down through conduit 10 to be deflected upwardly into conduit 11 by the conical baffle member 25 at the closed bottom end 12 of conduit 11. As hot mother liquor or solvent is introduced through pipe 17 and ejected through the openings in ring 22, the pressure created thereby causes the mixture to rise through conduit 11 and thence to drop into the interior of outer vessel 1 at the upper end thereof, being guided by the skirt member 14. The cover 15 is provided in order to avoid the escape of the mixture from the apparatus.

Conduits 10 and 11 are preferably provided with heating elements (not shown in the drawing) for the purpose of raising the temperature of the crude mineral suspension and restoring the heat lost by the liquor in the process of solution. Eighty to eighty-five per cent of the potassium chloride contained in the crude mineral is extracted within conduits 10 and 11.

The mixture in vessel 1 forms two levels, one in the collecting trough 5 from which liquor saturated with potassium chloride is removed from the apparatus through pipe 6, and the other below the frusto-conical portion 2 of vessel 1 as a result of the precipitation of solid sodium chloride. (See levels indicated on drawing.)

Means are further provided for extracting residual potassium chloride retained in the sodium chloride residue in vessel 1. This means may take the form of pipes 16 and 17 by means of which hot mother liquor or solvent may be injected within vessel 1, thereby saturating the mixture and raising the upper level of dissolved potassium chloride.

In order to cool the residue within vessel 1, cold water may be injected through pipe 19, the latter pipe serving both for cooling the residue and for heating the water injected thereby saving a substantial amount of fuel. The vessel 1 may also be provided with an indicator (not shown) by means of which the amount of precipitated material may be visually determined.

In order to facilitate the removal of residue from vessel 1 through the lowered discharge port 7, an auxiliary injector pipe 20 may be provided for applying liquid pressure. Valve 8 serves to open and close said discharge port and ejector 9 serves to carry the residue from the apparatus to suitable draining or filtering equipment.

By way of summary, the sequential steps in the method of the present invention may be enumerated as follows:

(a) Descent of a mixture of crude mineral and hot mother liquor at approximately 100° C. through conduit 10, the mixture containing, for example, approximately 25% of crude mineral.

(b) Propulsion of the mixture to the top of conduit 11 by forced injection of hot water through pipe 18.

(c) Precipitation and differential deposition in outer vessel 1 where water saturated with potassium chloride is separated and drawn off from the apparatus at a higher level for cooling and extraction of potassium chloride and common salt residue is collected in the main body portion of said vessel.

(d) Extraction of residual potassium chloride by injection of hot water through pipes 16 and 17.

(e) Cooling of settled residual material by means of pipe 19 preparatory to discharge.

(f) Removal of residual material through discharge port 7 of vessel 1 and subsequent passage through ejector 9 to suitable draining or filtering equipment.

While I have described my approved method and apparatus in connection with the specific problem of separating potassium chloride from a crude mineral mixture of potassium chloride and sodium chloride, it is to be noted that the method and apparatus described hereinabove may be employed generally for the separation of materials having differential solubility in a solvent or extraction medium.

Since certain additional modifications may be made in the method and apparatus of my invention without departing from the scope thereof, it is intended that all matter contained in the foregoing specification and shown in the accompanying drawing be interpreted merely as illustrative and not in a limiting sense.

What I claim as new and desire to secure by Letters Patent is:

1. Extraction apparatus for separating materials of differential solubility, comprising a vertically elongated outer vessel having a collecting trough defined at the upper end thereof and a conical lower portion defining a discharge port at the vertex thereof; a pair of concentric conduits disposed axially within said outer vessel and defining a path of flow for the material being separated, the innermost of said conduits being open at both ends thereof; the outermost of said conduits communicating at its upper end directly with the upper end of said outer vessel and being closed at the lower end thereof adjacent the lower open end of said innermost conduit; downwardly flaring skirt means disposed at the upper end of said outermost conduit for guiding the overflow of material into said outer vessel; conduit means for introducing hot solvent at the closed end of said outermost conduit; and additional conduit means disposed at spaced intervals along said outer vessel for introducing hot solvent therewithin at varying levels.

2. Extraction apparatus for separating materials of differential solubility, comprising a vertically elongated outer vessel having a collecting trough defined at the upper end thereof and a conical lower portion defining a discharge port at the vertex thereof; a pair of concentric conduits disposed axially within said outer vessel and defining a path of flow for the material being separated, the innermost of said conduits being open at both ends thereof; the outermost of said conduits communicating at its upper end directly with the upper end of said outer vessel and being closed at the lower end thereof adjacent the lower open end of said innermost conduit; downwardly flaring skirt means disposed at the upper end of said outermost conduit for guiding the overflow of material into said outer vessel and a depending cover member secured to said innermost conduit substantially at the level of said collecting trough; conduit means for introducing hot solvent at the closed end of said outermost conduit; and additional conduit means disposed at spaced intervals along said outer vessel for introducing hot solvent therewithin at varying levels.

3. Extraction apparatus for separating materials of differential solubility, comprising a vertically elongated substantially cylindrical outer vessel having an annular collecting trough defined at the upper end thereof and a conical lower portion defining a discharge port at the vertex thereof; a pair of concentric conduits disposed axially within said outer vessel and defining a path of flow for the material being separated, the innermost of said conduits being open at both ends thereof, the outermost of said conduits communicating at its upper end directly with the upper end of said outer vessel and being closed at the lower end thereof adjacent the lower open end of said innermost conduit; downwardly flaring skirt means disposed at the upper end of said outermost conduit for guiding the overflow of material into said outer vessel; conduit means for introducing hot solvent at the closed end of said outermost conduit; baffle means disposed at the closed end of said outermost conduit for directing the flow of material upwardly therefrom; additional conduit means disposed at spaced intervals along said outer vessel for introducing hot solvent therewithin at varying levels; and duct means located in said conical lower portion of said outer vessel for applying liquid pressure for discharging material through said discharge port.

References Cited in the file of this patent

UNITED STATES PATENTS

| Number | Name | Date |
|---|---|---|
| 773,222 | Porter | Oct. 25, 1904 |
| 994,679 | Hills | June 6, 1911 |
| 1,123,011 | Ripley | Dec. 29, 1914 |
| 1,283,364 | Trent | Oct. 29, 1918 |
| 2,156,236 | Bonotto | Apr. 25, 1939 |

FOREIGN PATENTS

| Number | Country | Date |
|---|---|---|
| 338,925 | Germany | Dec. 21, 1919 |